April 19, 1955  J. A. LANDIS  2,706,659
VACUUM CUP SUPPORTED GLARE SHIELD
Filed Aug. 22, 1952
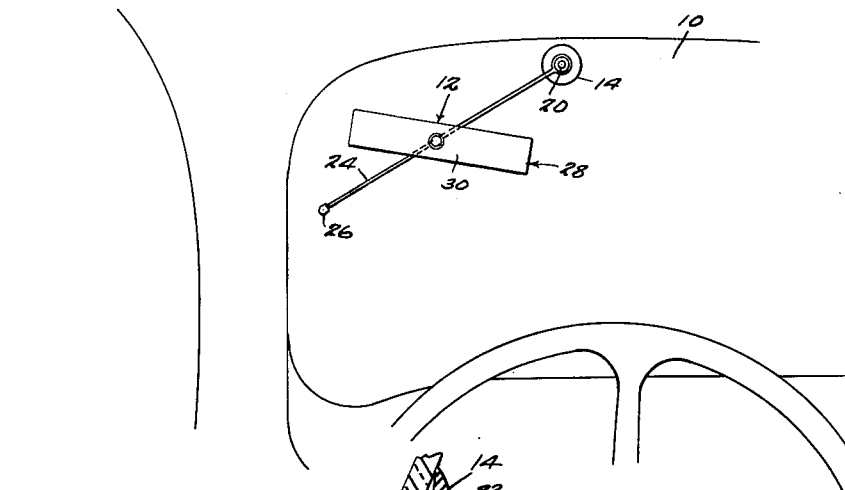
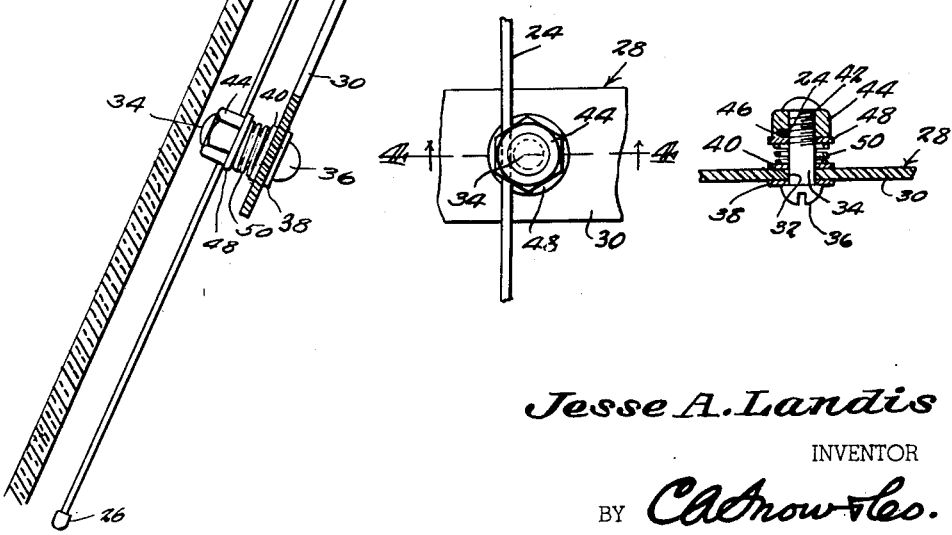
Jesse A. Landis
INVENTOR
BY C. A. Snow & Co.
ATTORNEYS.

United States Patent Office 2,706,659
Patented Apr. 19, 1955

2,706,659
VACUUM CUP SUPPORTED GLARE SHIELD

Jesse A. Landis, Eaton, Ohio

Application August 22, 1952, Serial No. 305,799

1 Claim. (Cl. 296—97)

This invention relates to a glare shield capable of being detachably connected to a conventional windshield of a vehicle and has for its primary object to protect the eyes of a driver of a vehicle from the glare of the headlights of an approaching vehicle.

Another object is to enable the shield to be supported at a selected position on the windshield which position may be determined by the operator of the vehicle to permit visibility through the windshield and at the same time protect an area thereof in which the glare of oncoming headlights is most bothersome to the particular driver of the vehicle.

The above and other objects may be attained by employing this invention which embodies among its features a vacuum cup adapted to be attached to a windshield in a selected position, an arm carried by the vacuum cup for movement in an arcuate path about the axis thereof which path lies substantially parallel to the surface of the windshield, and an elongated relatively narrow shield mounted midway between its ends on the arm for rotation about an axis which lies parallel to the axis of the vacuum cup and for adjustment longitudinally of the arm.

Other features include a pivot bolt extending through the glare shield and carrying a stop washer in spaced relation to the glare shield, a nut threaded on the pivot bolt and having a groove therein for receiving the pivoted arm and causing said arm to frictionally engage the stop washer, and yielding means mounted on the bolt between the stop washer and the shield for engaging the shield and stop washer and frictionally holding the pivot bolt on the arm and the shield in a selected position on the pivot bolt.

In the drawings,

Figure 1 is a fragmentary view of a windshield from the interior thereof showing this improved glare shield in position thereon, Fig. 2 is an enlarged fragmentary sectional view through the windshield and glare shield, Fig. 3 is an enlarged fragmentary face view of the exterior of the glare shield showing the manner in which it is mounted on the arm, and Fig. 4 is a fragmentary sectional view taken substantially on the line 4—4 of Fig. 3.

Referring to the drawings in detail a windshield 10 of a conventional motor vehicle has secured thereto my improved glare shield designated generally 12 which comprises a vacuum cup 14 which is adapted to be detachably connected to the windshield in a conventional manner. The vacuum cup 14 is provided with an axially outstanding stem 16 and formed in the stem 16 adjacent its junction with the vacuum cup 14 is an annular groove 18. A suitable finger grip 20 is carried by the stem of the vacuum cup to facilitate its application to and removal from the windshield 10.

Extending around the stem 16 of the vacuum cup 14 and lying within the groove 18 is the loop 22 of an arm 24 which comprises a length of wire having the loop 22 formed at one end thereof, and threadedly engaged with the arm 24 adjacent the end thereof remote from the loop 22 is a stop 26.

A glare shield designated generally 28 comprises an elongated body 30 having extending therethrough midway between opposite sides and ends an opening 32 for the reception of a pivot bolt 34 having at one end a head 36. A washer 38 is interposed between the head 36 of the pivot bolt 34 and the body 30, and surrounding the pivot bolt 34 on the side of the body 30 remote from the washer 38 is a friction washer 40. The end of the pivot bolt 34 remote from the head 36 is threaded as at 42, and threadedly engaged with the threads 42 is a nut 44 having a groove 46 extending transversely thereof adjacent the threaded opening of the nut 44. Surrounding the pivot bolt 34 adjacent the nut 44 and bearing on said nut is a friction washer 48, and surrounding the pivot bolt between the friction washer 40 and friction washer 48 is a compression coiled spring 50 which exerts pressure on the friction washers to hold the body 30 against the friction washer 38 adjacent the head 36. It will thus be seen that while the shield 28 may be rotated about the axis of the bolt 34, the spring will exert sufficient effort on the friction washers 48 and 40 to hold the body 30 in a selected position.

In use the stop nut 26 is unthreaded from the arm 24 and the arm entered into the groove 46 and the shield 28 is moved along the arm to a selected position and will remain in such position due to the frictional contact of the friction washer 48 and walls of the groove 46 on the arm 24. With the stop nut 26 returned to its position on the arm, it is obvious that the arm may be swung to a selected angular position about the axis of the stem 16 and the shield 28 may be rotated to a selected position about the axis of the bolt 34.

Owing to the pressure of the spring 50 on the washers 40 and 48, it will be evident that the shield 28 may be held in a selected position about the axis of the bolt 34 and at the same time the spring will act against the washer 48 to cause it to frictionally engage the arm 24 and hold the shield 28 in a selected position along the arm. The frictional engagement of the eye 22 on the walls of the groove 18 will hold the arm 24 in a selected position about the axis of the stem 16 so that the shield may be adjusted to a position on the windshield where the eyes of the driver of the vehicle will be protected from the glare of oncoming headlights.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

A glare shield for attachment to the windshield of a vehicle, said glare shield comprising a vacuum cup adapted to be attached to a windshield in a selected position, an arm carried by the vacuum cup for movement in an arcuate path about the axis thereof, an elongated relatively narrow glare shield, a bolt extending through said shield midway between opposite sides and opposite ends thereof, a stop washer encircling the bolt in spaced relation to the glare shield, a compression coiled spring encircling the bolt between the glare shield and the stop washer, a nut threaded on the bolt and engaging the stop washer for compressing the spring against the shield, and said nut having a groove opening through the side thereof adjacent the stop washer for receiving the arm whereby the stop washer will be yieldingly urged by the spring to frictionally hold the glare shield in a selected longitudinal position on the arm.

References Cited in the file of this patent

UNITED STATES PATENTS

| | | |
|---|---|---|
| 504,717 | Fanckboner | Sept. 12, 1893 |
| 1,409,340 | Hanna | Mar. 14, 1922 |
| 1,598,010 | Price | Aug. 31, 1926 |
| 1,953,877 | Chase | Apr. 3, 1934 |
| 2,345,650 | Attwood | Apr. 4, 1944 |